Patented Aug. 19, 1952

2,607,714

UNITED STATES PATENT OFFICE 2,607,714

MATS OF GLASS FIBERS INTERBONDED WITH READILY REMOVABLE BINDER

Clayton A. Smucker, Newark, Ohio, assignor to Owens-Corning Fiberglas Corporation, a corporation of Delaware No Drawing. Application November 1, 1946, Serial No. 707,319

16 Claims. (Cl. 154—101)

This invention relates to articles of manufacture composed essentially of inorganic fibers fabricated temporarily to maintain a predetermined condition of mass integrity and fiber arrangement under stresses incident to normal handling, during transportation, application or use.

Generally, inorganic fibers, such as glass fibers, in themselves do not have the attributes necessary to maintain the fibers in a predetermined arrangement and a felted mass formed therefrom often lacks the self-sufficiency to resist disintegration under stresses incident to normal handling. The desideratum of maintaining a mass of glass fibers in a predetermined arrangement and shape has more recently arisen coincident with the expanding use of such fibrous materials for resinous reinforcement, tower packings, battery separators, insulation or the like. Preforming not only simplifies the handling during transportation, application and fabrication, but more uniform fiber distribution is assured and, in view of the greater density of the shaped mass, transportation costs are substantially reduced.

For this purpose, adhesive materials are applied to the surfaces of the glass fibers, holding the fibers in the arrangement to which they are subsequently formed. Normally, adhesive resin amounts, ranging from three per cent to sixty per cent, are sufficient for the purposes desired, depending on the desired permanence and characteristics of the pre-formed mass. Naturally, the resin application and mass formation are most readily performed in adjunct with the fiber forming process or closely related thereto where the fiber surfaces are more fully exposed for coating and, particularly, in view of the fact that consumers generally are not adequately equipped or experienced to fabricate their own shaped masses from the randomly arranged fibers.

Difficulties arise wherein it is desirable to have the fibrous mass in a predetermined condition of fiber arrangement as described, but the resinous adhesive applied for such purpose impairs the use or operation of the self-sufficient mass in the desired application. For example, it is expedient to provide a fabric of glass fibers in a shape simplifying the positioning of the fiber packing in a packed tower for desalting petroleum crudes, wherein the affinity of the water for the glass so modifies the interfacial forces between the liquid particles, that the oil and water emulsion is broken, enabling the salt solution subsequently to be separated from the petroleum crude by flotation means. In such instances, merely on a single passage through the glass fiber packed tower, the salt content of petroleum crudes has been reduced from as much as four hundred pounds of salt per thousand gallons of crude to approximately ten pounds of salt per thousand gallons. It is manifest, that foreign matter on the surface of the glass fibers might so modify the glass characteristics that de-emulsification may not advantageously be effected.

Another instance wherein it is desirable to provide a fibrous fabric in predetermined form and still have the fibers themselves unmodified so as to impart unmodified the favorable physical, chemical and electrical properties of glass fibers, resides in the use of the fabric as a reinforcement for relatively expensive and special resins. Residual adhesives or impurities might contaminate the resins and impair the final results. Glass fiber mats treated in accordance with the present invention find great utility when used as a packing in alcohol fractionating towers as well as for battery mats and separators which require special treatment during their manufacture.

These and other fibrous masses may be fabricated by the application onto the glass surface of an adhesive having the characteristics of good adhesion to glass under all weather conditions to maintain the mass integrity of the fibrous mass, and yet be easily and completely flushed from the fiber surfaces with fluids that do not contaminate the process or fabricated product and are safe, low cost and readily available. One such solvent particularly suitable for removing resinous binders from the packings and reinforcement described is water.

Heretofore, fibrous mats of the type described have been fabricated with such generally accepted water soluble adhesives as gelatin glue, blood albumen, starch, flour, other proteins, polyvinyl alcohol or the like. These have not proven adequate for the described applications in view of their relatively poor bond strength with glass fibers. Furthermore, most of the natural water soluble adhesives are so hygroscopic, that exposures to relatively high humidities for a short time, causes such loss of adhesion that adequate mass integrity is not obtained during normal handling. This is of particular importance when the shaped mass is to be used in a tower for de-salting petroleum crudes, for most units are located in the southern belt where humidities above 90% predominate. From the standpoint of removal of the adhesive by solution, these materials are so slowly soluble in cold water that resin solution not only calls for overly extended exposures, but complete removal is seldom obtained. For example, gelatin merely swells on immersion in water to form a soft mass that fills the interstices between the fibers and clogs the tower pipes so that their use is substantially impaired. Similarly, the synthetic polyvinyl alcohols are very slowly soluble and often alcohol or hot water are added to enhance solution.

With the above in view, it is an object of this invention to provide a binder for maintaining inorganic fibers, such as mineral fibers, in a predetermined condition of fiber arrangement which is readily removable to permit the inorganic fibers to function properly for their intended use.

Another object of this invention is to provide a composite mass of glass fibers adhered with a water soluble binder capable of maintaining the fiber arrangement under all weather conditions, the binder being readily and completely removable by water without disturbing the fiber arrangement.

A further object is to produce a bonded fabric of randomly arranged glass fibers from which the binding resins may be subsequently removed to provide unmodified glass fibers for use as a tower packing or resinous reinforcement.

In carrying out this invention, the fibers are coated with a water soluble resinous binder and formed into a fabric having the proper density and shape for its intended use. Limitations reside in the characteristics of the water soluble binder wherein complete solution is desired merely on being flushed with water so that the pure glass fibers having the desired arrangement and density are exposed for subsequent use as a packing in a de-salting tower or as a reinforcing filler in molded plastics, and yet have adequate adhesion during extended exposure to high temperatures and humidities that the fiber arrangement is not disturbed by normal handling.

I have found that suitable resinous water soluble adhesives consist of the cellulose ether derivatives modified with hydroxylated aliphatic, aromatic or alicyclic organic radicals, or mixed aliphatic-aromatic radicals, such, for example, as hydroxy-ethyl cellulose or carboxy-ethyl cellulose. Other water soluble cellulose ethers modified with low carbon length, aliphatic, aromatic or mixed aliphatic-aromatic radicals are equally suitable, such, for example, as methyl cellulose, benzyl cellulose, or the like.

During the manufacture of the discontinuous glass fibers, it is expedient to apply a solution of the resinous binder such as hydroxyethyl cellulose to the surfaces of the fibers, as by spraying or the like. The coating resins not only function as an adhesive enabling subsequent bonding of the fibers to the desired shape, but, concomitantly, operate as a protective coating and sizing for the glass fibers, militating against their damage or deterioration during handling in fabrication or transportation. Fibrous fabrics bonded with hydroxy-ethyl cellulose have retained their form even after exposure to elevated temperatures and ninety per cent relative humidity for as long as twenty-four hours or more.

In addition, hydroxy-ethyl cellulose is so readily soluble in cold water that complete removal thereof is effected without the expenditure of considerable time or material, the solution thereof being so complete that clogging of pipes or drains or the interstices between the fibers is substantially prevented. It has been found that a solution containing 10–40 per cent of the hydroxy-ethyl cellulose in water may be readily sprayed onto the surfaces of the glass fibers to deposit thereon sufficient solids for the desired adhesion, normally amounting to 4–15 per cent by weight. It is to be understtood that the viscosity of the resinous binder not only is dependent upon the solids content of the solution, emulsion or dispersion, but is equally controlled by the chemical composition, degree of polymerization and the average molecular weight of the resin.

Other means for effecting the desired resin application is by a flow coat or dipping process for which the resins are provided in water solution, emulsion or dispersion. The coated fibers may then be formed to the desired shape and the solvents driven off subsequently to render the binders solid so that the shape is maintained, or else the drying operation may first be effected and the fibers subsequently formed to the desired arrangement by heat and pressure or by rendering the resin once more adhesive by solvent means.

It is manifest that the resins described are particularly suited for bonding a mass of inorganic glass fibers so that the fiber arrangement is maintained under all weather conditions and stresses incident to normal handling. In this manner the large desalting towers of the petroleum art may be easily packed with a uniform, compact distribution of glass fibers in the desired arrangement. Since the de-emulsification process enabling the salt solution to be separated from the petroleum crudes is believed to reside in the preferential attraction of the water particles to the glass surface, thereby so to modify the interfacial forces that "breaking" occurs, it is desirable to free the surfaces of the glass fibers from any materials that might alter their water attraction. Advantageously, a water soluble adhesive may be removed by water which is not only readily available at all places, but in this instance also forms a part of the through-put materials so that small amounts that remain do not contaminate the product or impair the process. It is only desirable that water quickly and completely removes the adhesive from the surface of the glass and for this purpose suitable adhesives, as previously pointed out, are carefully developed.

In a similar sense, the use of readily soluble adhesives for glass fiber bonding purposes are adapted to hold the fibers in a predetermined arrangement until the resins can be replaced by more expensive special resinous materials at the consumer's plant. Obviously, residual resins left on the fibers might contaminate the composite mass so that ultimate properties are not obtained. In this manner, the glass fiber fabricator can form the fibrous mass into various predetermined shapes with one water soluble resin, the resin being readily replaced with specific resins as desired to accomplish a desired purpose, thus reducing considerably the production costs.

It is to be understood that other suitable readily soluble adhesives may be used to provide a formed mat suitable for the described and other purposes without departing from the invention, especially as defined in the appended claims.

I claim:

1. An article of manufacture constituted with glass fibers arranged in a spaced-apart, three-dimensional relation as desired for an intended use at a distant station in which the fibers are bonded one to another at their intersections with a water-soluble hydroxylated cellulose ether to hold the fibers in the desired arrangement and impart mass integrity capable of resisting the forces incident to normal handling, which binder, when the mass is in position for its intended use, may be washed from the mass by water.

2. An article of manufacture constituted with glass fibers which are arranged in a spaced-apart, three-dimensional relation, desired for their intended use at a distant station, in which positions the fibers are bonded at their intersections with a water soluble cellulose ether to provide mass integrity sufficient to resist the forces incident to normal handling, which binder is readily and completely removable by a water wash when the article is positioned for its intended use.

3. An article of manufacture as claimed in claim 2 in which the binder comprises 4 to 15 per cent of the composite mass.

4. A felted, void-containing mass of discontinuous glass fibers arranged in a helter-skelter, jackstraw relation intended for use as a tower packing and in which the fibers are bonded one to another at their junctures with a water soluble hydroxylated cellulose ether present in amounts sufficient to impart mass integrity to the fabric until the packing is installed in the tower whereafter the binder may be completely removed by water to enable the fibers to re-acquire their original characteristics suitable for their intended use.

5. A tower packing composed of a felted mass of glass fibers arranged in a three-dimensional relation and bound one to another at their junctures by a binder comprising a water-soluble hydroxylated aliphatic cellulose ether.

6. A tower packing composed of a plurality of glass fibers held in a three-dimensional space relationship by a binder comprising a hydroxyalkyl cellulose, said alkyl being selected from the group consisting of methyl and ethyl.

7. A tower packing composed of a felted mass comprising a plurality of discontinuous glass fibers indiscriminately arranged in a three-dimensional, helter-skelter fashion and bonded at their intersections by hydroxyethyl cellulose.

8. The method of preparing a felted mass of discontinuous glass fibers having a predetermined condition of density and fiber arrangement comprising incorporating a water soluble cellulose ether with a mass of glass fibers to impart integrity to the mass of fibers and thereafter when in position of use washing the mass with water to remove the cellulose derivative and to free the surfaces of the fibers.

9. The method of packing a tower with fibrous glass which comprises forming and bonding the glass fibers into a mass of predetermined fiber arrangement with a water soluble cellulose ether derivative, installing said forward mass of bonded fibers in said tower, and thereafter flushing said tower with water to remove the cellulose derivative from the surface of the fibers.

10. The method of packing a tower with fibrous glass having unmodified surface characteristics which comprises incorporating a hydroxylated cellulose ether with the glass fibers to form a mass of the glass fibers having the characteristics of mass integrity and predetermined fiber arrangement, installing the formed mass in the tower, and treating said mass while in the tower with water to remove the hydroxylated cellulose ether and free the surface of the fibers.

11. The method of packing a tower as claimed in claim 10 in which the hydroxylated cellulose ether is hydroxy-ethyl cellulose.

12. The method of handling glass fibers intended for a specific use comprising the steps of binding the glass fibers with a water soluble hydroxylated cellulose ether into a felted mass of a plurality of fibers having a sufficient mass integrity to resist forces incident to normal handling and a predetermined shape for particular applications, and then washing the mass with water, when in position of use, to remove the binder and restore the original surface characteristics to the fibers for their intended use.

13. The method of handling glass fibers intended for a specific use at a distant station comprising the steps of binding a plurality of the glass fibers in an interfelted position with a small amount of water soluble hydroxylated cellulose ether to form the fibers into a mass capable of resisting forces incident to normal handling in transporting and positioning the mass, and, when in position of use, removing the binder with a water-wash to free the surfaces of the glass fibers for their intended use.

14. The method of handling glass fibers intended for a specific use wherein spaced-apart fiber arrangement and density are of particular importance comprising the steps of securing the fibers one to another at their junctures with a small amount of a water soluble hydroxylated cellulose ether to form a self-sufficient mass of predetermined shape and fiber arrangement, working with the mass so bonded to position the mass for its intended use, and then flushing the mass with water to remove the water soluble binder and free the fibers in their desired relation for their intended use.

15. The method of preparing a packed tower in which the packing is made up of glass fibers comprising the steps of installing the glass fibers in increments having the characteristics of mass integrity provided by water soluble cellulose derivative resins bonding the fibers in the increments with sufficient strength to resist forces incident to normal handling, and then flushing the packed tower with water to remove the binder and free the surfaces of the glass fibers for their intended use and in their desired position of use.

16. The method of preparing a packed tower for resolving aqueous-in-oil emulsions by glass fiber contact materials packed into the tower comprising the steps of packing the tower with glass fibers bonded with a water soluble hydroxylated cellulose ether into increments of predetermined shape and fiber distribution with sufficient mass integrity to retain such fiber arrangement during normal handling, and then flushing the packed tower with water alone to remove the binder and to restore the normal characteristics to the fibers by which demulsification is effected.

CLAYTON A. SMUCKER.

(References on following page)

REFERENCES CITED

The following references are of record in the file of this patent:

UNITED STATES PATENTS

| Number | Name | Date |
|---|---|---|
| 1,978,785 | Dreyfus | Oct. 30, 1934 |
| 2,143,015 | Kleinschmidt | Jan. 10, 1939 |
| 2,245,620 | Steinbock | June 17, 1941 |
| 2,263,900 | Nollan | Nov. 25, 1941 |
| 2,339,431 | Slayter | Jan. 18, 1944 |
| 2,347,031 | Cupery | Apr. 18, 1944 |
| 2,351,174 | Whitehead | June 13, 1944 |

FOREIGN PATENTS

| Number | Country | Date |
|---|---|---|
| 193,254 | Germany | Jan. 21, 1905 |

OTHER REFERENCES

Industrial and Chemical Engineering (Ind. Ed.), March 1946, page 54.

Fibrous Glass as a Packing Material for Packed Column Distillation, by George W. Minard, Joseph H. Koffolt, and James R. Winthrow, in Transactions of American Institute of Chemical Engineers, vol. 39, No. 6 (December 25, 1943), pp. 813–851, especially bottom of page 818.